Aug. 15, 1961 L. UBBELOHDE ET AL 2,995,923
METHOD AND APPARATUS FOR MEASURING THE THICKNESS OF ADSORPTION
LAYERS OF LIQUID FORMED BETWEEN TWO GLASS SURFACES
Filed June 24, 1952
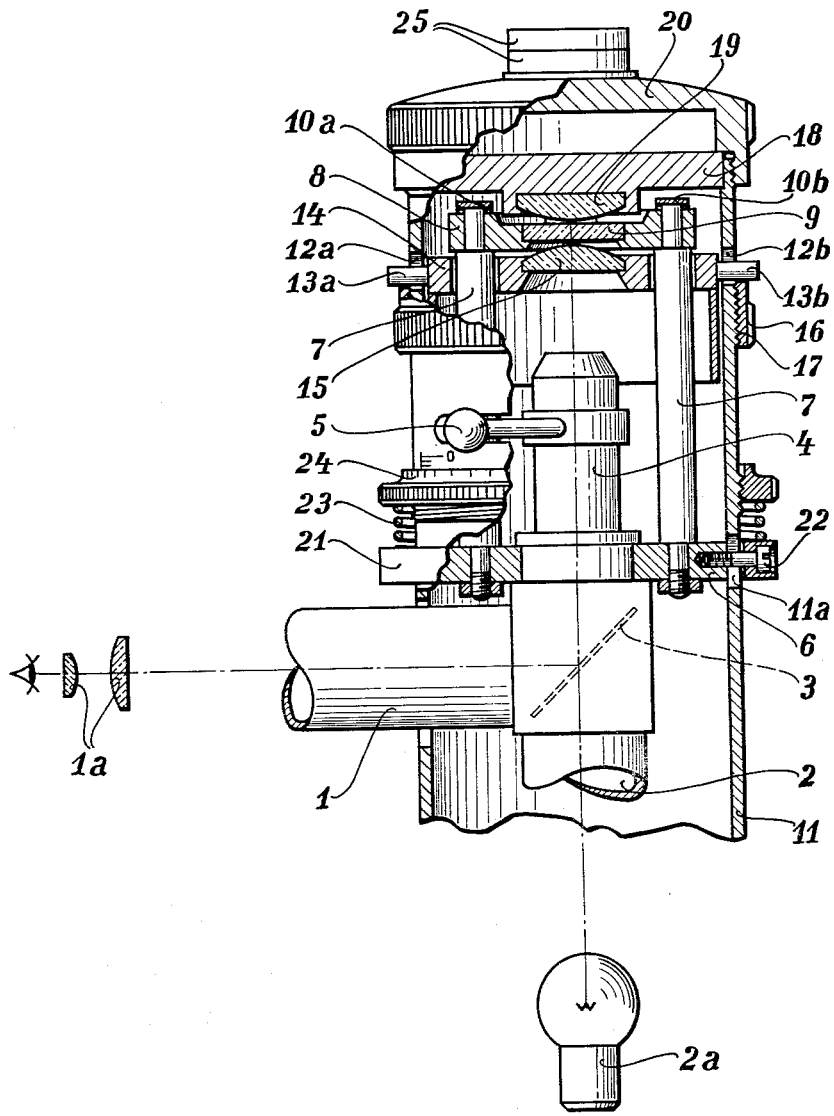
INVENTORS
Leo Ubbelohde
BY Hermann Piepert
Benj. T. Rauber
their attorney

United States Patent Office 2,995,923
Patented Aug. 15, 1961

2,995,923
METHOD AND APPARATUS FOR MEASURING THE THICKNESS OF ADSORPTION LAYERS OF LIQUID FORMED BETWEEN TWO GLASS SURFACES
Leo Ubbelohde, Dusseldorf, and Hermann Riepert, Wetzlar, Germany, assignors to Ernst Leitz, G.m.b.H., Wetzlar (Lahn), Germany, a corporation of Germany
Filed June 24, 1952, Ser. No. 295,286
Claims priority, application Germany Dec. 20, 1951
11 Claims. (Cl. 73—64)

Liquids, especially those with polar and/or polarizable molecules, form on solid surfaces adsorption layers of special physical and chemical character namely bearing capacity. Between two solid surfaces such layers assume special properties, even with slight pressures, which depart very widely from the properties of unstressed liquids.

It is important to determine the properties and the thickness of such adsorption layers since they make it possible to give indications or disclosures about the molecular and molecular association conditions, and the constitution and bearing capacity of the liquids.

With lubricants (lubricating oil and the like) these adsorption layers are of greater meaning in that because of their increased viscosity or even of their virtually solid condition, they may hold the rubbing surfaces (for example of a bearing or shaft) separate from each other and may prevent their destruction.

The greater the content of polar and/or polarizable molecules of the oil, the greater is the capacity for the formation of large and pressure resistant molecule aggregates, and accordingly the thicker and more pressure resistant are the layers of the oils. This resistance to pressure of an adsorbed layer of liquid is herein designated as "bearing capacity," which is in agreement with the equilibrium between pressure and the adsorbing force. Since, however, the various oils form layers of very different thicknesses, and the value of the oil depends very extensively on the thickness of such layers, it is important to measure whether the oil forms thinner or thicker layers.

Our invention provides a method and apparatus whereby the thickness of a layer of liquid adsorbed between two surfaces subjected to a control pressure normal to the planes of said surfaces may be measured and thereby the bearing capacity determined.

In the method of our invention the adsorbed layer is formed between two surfaces of two solid testing bodies. The layer is subjected to pressure between these surfaces and the thickness of the layer determined. The thickness may be determined in any suitable manner. For example two testing plates may be pressed together and their combined thickness measured. Then an adsorption layer is produced between the plates which may be subjected to any selected pressure transverse to their surfaces, and the thickness of the two plates plus the adsorbed layer is measured. The difference between measurements gives the thickness of the adsorbed layer.

In a preferred form of the invention comparative measurements to determine the thickness of the pressured layer are obtained by forming the testing bodies by a fixed plate having a plane light reflecting surface and a plano convex lens having its convex surface opposed to said plane reflecting surface and so arranged as to be moved by pressure relatively to said plane reflecting surface. The liquid to be adsorbed may be placed between the plano convex lens and the light reflecting surface of the plate. A beam of light is then directed through the plate to the reflecting surface and from the reflecting surface to a microscope, or other magnifying element. Newton's rings are formed in the reflected light and the thickness of the pressured adsorbed layer may be evaluated by the change in diameter of the inner or any selected Newton's ring when the convex surface is in contact with the surface of the plate and when it is separated therefrom by the adsorbed liquid layer.

To avoid the influence of the refractive index of the adsorbed layer altering the Newton's rings preferably the adsorbed layer is formed between two testing bodies, namely a fixed plate and a movable convex body, and for measuring the thickness of layer a lens is provided connected with the convex body, for forming Newton's rings in the air space between the lens and said fixed plate. The fixed plate is transparent so that the microscope or magnifying element may be focused first on the adsorbed layer to detect any impurities or residue and then on the reflecting surface to observe the Newton's or interference rings.

Preferably the light is a monochromatic light or is viewed with a colored glass plate.

The adsorbed layer may be formed between a convex body and a concave surface, the concave surface having a greater radius than the convex body being formed in the fixed plate. Also the convex surface may be advantageously flattened or may be ground flat at the center. Then the circular border of the plane ground surface and not the apex of the convex surface lies nearest to the concavely ground surface of the opposite glass. Under the plane circular area of the ground surface Newton's rings also occur and the observations and measurements can be improved.

The manner of measurement is as follows:

Some of the liquid to be investigated is placed on the concavely ground surface and the convex glass body is then dipped into the liquid so that a distance of about 1 mm. remains between the mid point of the two ground surfaces. Then one waits until observation shows that equilibrium has occurred and thereupon permits the convex glass body to sink into the liquid, under load or pressure where required, so that the adsorbed layer between the two ground surfaces has assumed the desired physical character. With lubricating oil it is most desirable that the adsorbed layer should assume a solid character. For this purpose one must weight or load the upper glass body so heavily that a pressure of several atmospheres is attained at the narrowest place between the two surfaces. This pressure must be maintained for a time sufficient to establish the pressure-thickness equilibrium. Then the measurement proceeds with the aid of Newton's rings.

The position and radius of the Newton's rings provides the possibility of determining the thickness of the adsorption layer because it is known that under a pressure of a few atmospheres between the two ground surfaces, a layer of adsorbed and virtually solid lubricating oil is of such thickness that the first Newton's rings are only a little changed. The thicker the adsorbed layer the smaller is the radius of the innermost of the Newton's rings. And from this radius and the known differences of the spherical radii of both ground glass surfaces and the refractive index of the liquid being tested one can exactly calculate the thickness of the adsorbed layer between the apex points of the spherical surfaces.

The adsorbed layers under pressure have the peculiarity, upon diminishing the pressure, gradually to suck in other liquid portions and thereby become thicker. These gradual changes of the layer thickness can be measurably followed by the movements, that is, the gradual decreasing, of the Newton's rings.

In order to be able to apply the process when the material of the adsorbed layers has a refractive index approaching that of glass, the layer is produced between two testing elements of which at least one is coupled with a transparent observation apparatus. This observation apparatus must, at the same time, be taken opposite one of the surfaces under pressure when the two testing bodies are pressed against each other in order to produce the Newton's rings which are to be evaluated. These rings become especially clear because air is present here. Thereby the calculations are also simplified because the wave length of the illuminating light beam may be referred to air.

The apparatus required for carrying on this improved process can be constructed in various ways. First, each testing element can be coupled with an observing element of which one must be transparent. The number of pairs of testing elements can be increased to three, arranged in the corners of a triangle, in the center of which is the observing element. When there is arranged between the testing element and observing element an element which forms both a testing and an observing element, this can be transparent so that one can point the microscope first to the testing layer in order to control this as to impurities, whereupon one points it to the surface of the observing element in order to evaluate the Newton's rings.

In the accompanying drawing there is shown an arrangement, by way of example, of a preferred form of the invention.

In the apparatus as shown in the drawing, a support, not shown, carries both the observation connection 1 with the eye-piece 1a and the illuminating connection 2 with an incandescent lamp 2a. The division of the light beam from the lamp 2a is accomplished at a partially transparent mirrored plate 3 above which a microscope objective 4 is arranged. The latter carries an adjusting handle 5. On the connection 2, a plate 6 is rigidly mounted which is provided with several columns 7. On the free ends of these columns is fastened a carrying plate 8 for a glass plate 9 serving as a testing and observing plate. The plate 8 is held in place on the columns 7 by leaf springs 10a and 10b. The entire arrangement is surrounded by a tube 11 which has in its upper end two slits 12a and 12b in which guide trunnions 13a and 13b for a supporting plate 14 are guided. In the supporting plate 14 is supported a plano convex lens 15 for the observation or viewing. Underneath the slits 12a and 12b a positioning ring 16 is threaded onto threads 17 on the tube 11. At the upper end of the tube 11 is a mounting plate 18 provided with a testing plate 19 enclosed by a cover 20. United with the plate 6 by means of screws 22 extending through the slit 11a in the tube 11 is an enclosing ring 21. On the ring 21 is supported a coil spring 23 the upward pressure of which on the tube 11 is regulated through an adjusting nut 24. The tube 11 is weighted by replaceable weights 25.

In order to carry through a test, some of the liquid to be tested is placed onto the upper surface of the glass plate 9, then the mounting plate 18 is superimposed and the cover 20 screwed down. Upon actuating the positioning handle 5 one focuses the microscope objective first on the fluid in order to test whether the same is free from residues and from impurities. Thereupon the objective is focused to the under side of the glass plate 9. By turning the ring 24 the necessary loading for the test is obtained, at which the testing element 19 should be acting on the liquid to be tested and on the plate 9. Through the same arrangement the observing element 15, which by means of the positioning ring 16 had been brought to a selected distance from the under side of the glass plate, now moves away from the under side of the plate 9 simultaneously with, and in the same measure as, the test plate 19 approaches the upper side of the plate 9 By the action of the test pressure one observes the corresponding Newton's rings formed by the interference of the light beams striking the mirror 3 from the lamp 2a and from the plate 9. For the application of this pressure one can substitute either weights or hydraulic, electromagnetic or similar arrangements.

Having described our invention, what we claim is:

1. Apparatus for determining the thickness and carrying capacity of an adsorbed liquid layer under selected pressures, which comprises a fixed glass plate, a pressure applying element having a convex surface opposed to one face of said fixed plate, the opposite surface of said plate being reflecting, a glass element having a convex surface opposed to the reflecting face of said fixed plate, the centers of curvatures of said pressure applying element and glass element being on a line normal to the surfaces of said fixed plate, a connector connecting said pressure applying element and said glass element to move in fixed relation to each other, a source of illumination directed through said glass element to said reflecting surface and a magnifying element to receive the light beams reflected from said reflecting surface through said glass element.

2. The apparatus of claim 1 having pressure loading means for said pressure applying element.

3. The apparatus of claim 2 in which said pressure loading means comprises a weight on said pressure applying element and a spring acting against said weight and means to regulate the pressure of said spring.

4. The apparatus of claim 2 having means in which said connector is adjustable to vary the distance between said pressure applying element and said glass element.

5. A method of determining the relation of the thickness of an adsorbed film of liquid between a fixed surface and a surface pressed thereto under a known applied force to determine the bearing capacity of the liquid which comprises placing a film of liquid between a fixed pressure surface and a movable pressure surface, applying increasing force to said movable surface to press it toward said fixed surface until further increase in pressure fails to express additional liquid, leaving only adsorbed liquid, moving a convex reflecting surface from contact with a fixed reflecting surface in exact ratio to the movement of said movable pressure surface under said force toward said fixed pressure surface, and passing a beam of light through one of said reflecting surfaces to the other to form interference rings of light reflected from said reflecting surfaces and of diameters varying with the movement of said reflecting surfaces, thus to determine the thickness of said adsorbed liquid when all fluid has been expressed and thus to indicate the bearing capacity of the liquid.

6. Apparatus for determining the thickness of a liquid adsorbed between opposed plates under pressures to determine the bearing capacity of said liquid which comprises a fixed, transparent, supporting plate, a pair of opposed plano convex lenses, one on one side of said plate and the other on the opposite side thereof, with the convex surfaces of said lenses closely adjacent to the respective opposed surface of the plate, a mounting for said lenses holding them at a fixed spatial distance from each other and movable to and from the respective surfaces of said plate, means for loading said mounting means with a variable force to move one of said lenses toward the adjacent face of said plate and the other equally away from the opposite face, a light source projecting a light beam through said assembly of plate and lenses and a magnifying means to receive the light reflected from said plate and lens assembly and means to focus the magnifying means alternatively to the space between the plate and the more distant lens and to the nearest surface of the plate.

7. The apparatus of claim 6 having weights to load said mounting to apply pressure on one lens toward said plate and an adjustable counterweight in the opposite direction.

8. The apparatus of claim 7 in which the adjustable counterweight comprises a spring supporting said mounting and an adjustable ring movable to compress said spring to a greater or less force against said mounting.

9. The apparatus of claim 6 in which the central parts of said lenses are flattened to a plane surface.

10. The apparatus of claim 6 in which said convex lenses are co-axial and movable in a coaxial direction.

11. Apparatus for determining the bearing capacity of a liquid layer adsorbed between a pair of solid surfaces which comprises a fixed, transparent, plate, a pressure applying element having a convex reflecting surface opposed to one face of said fixed transparent plate, a second transparent element having a convex surface opposed to the opposite face of said fixed, transparent, plate, the centers of curvatures of said convex surfaces being on a line normal to the surfaces of said fixed plate, an illuminating lamp providing a light beam on said line toward one side of said transparent elements to form interference rings of diameters corresponding with the distance of said convex surfaces from said fixed surfaces, a semi-reflecting mirror in the path of said light beam to permit light to pass to said transparent elements and to deflect light reflected therefrom to an observing place to observe said interference rings, and means coupling said pressure applying element and said second transparent element to move said elements simultaneously in the same direction and at the same rate with increasing pressure until further increase expresses no additional liquid leaving only adsorbed liquid between one convex surface and said fixed plate thereby to determine the thickness of said adsorbed liquid and the bearing capacity of the liquid.

References Cited in the file of this patent

UNITED STATES PATENTS

| | | |
|---|---|---|
| 674,951 | Abbe | May 28, 1901 |
| 1,044,502 | Crehore et al. | Nov. 19, 1912 |
| 1,996,063 | Corkran | Apr. 2, 1935 |
| 2,031,253 | Davis | Feb. 18, 1936 |
| 2,338,981 | Straub | Jan. 11, 1944 |
| 2,591,666 | Barkas et al. | Apr. 8, 1952 |

FOREIGN PATENTS

| | | |
|---|---|---|
| 7,232 | Switzerland | Aug. 20, 1893 |
| 901,685 | France | Nov. 13, 1944 |
| 881,111 | Germany | June 29, 1953 |

OTHER REFERENCES

Applications of Interferometry, published by John Wiley & Sons, Inc., New York, N.Y., Fourth Edition, 1950, Williams, W. E., pages 34, 35 cited.

UNITED STATES PATENT OFFICE
CERTIFICATE OF CORRECTION

Patent No. 2,995,923                         August 15, 1961

Leo Ubbelohde et al.

It is hereby certified that error appears in the above numbered patent requiring correction and that the said Letters Patent should read as corrected below.

In the grant (only), lines 1 and 2, name of second inventor, for "Harmann Riepert" read -- Hermann Riepert --.

Signed and sealed this 2nd day of January 1962.

(SEAL)
Attest:

ERNEST W. SWIDER                       DAVID L. LADD
Attesting Officer                       Commissioner of Patents

USCOMM-DC